June 11, 1968

K. H. BURGIN 3,387,443

BRANCH SEPARATOR AND FRUIT PICKER

Filed Aug. 2, 1967

INVENTOR
KERMIT H. BURGIN
BY
Herbert A. Minturn
ATTORNEY

June 11, 1968  K. H. BURGIN  3,387,443
BRANCH SEPARATOR AND FRUIT PICKER
Filed Aug. 2, 1967  6 Sheets-Sheet INVENTOR
KERMIT H. BURGIN
BY
Herbert A. Vinturry
ATTORNEY

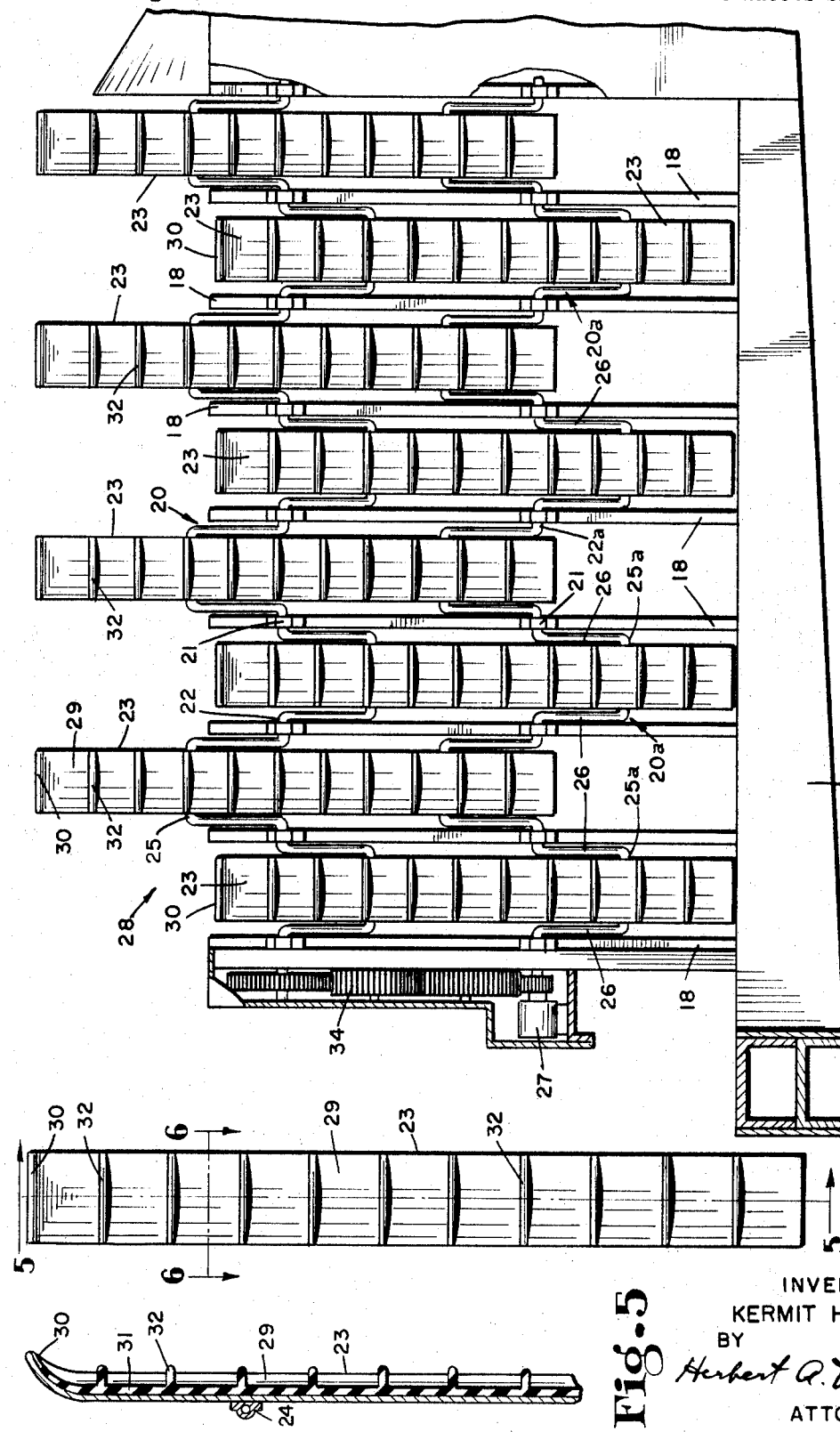

June 11, 1968  K. H. BURGIN  3,387,443
BRANCH SEPARATOR AND FRUIT PICKER
Filed Aug. 2, 1967  6 Sheets-Sheet 4

INVENTOR
KERMIT H. BURGIN
BY
Herbert A. Minturn
ATTORNEY

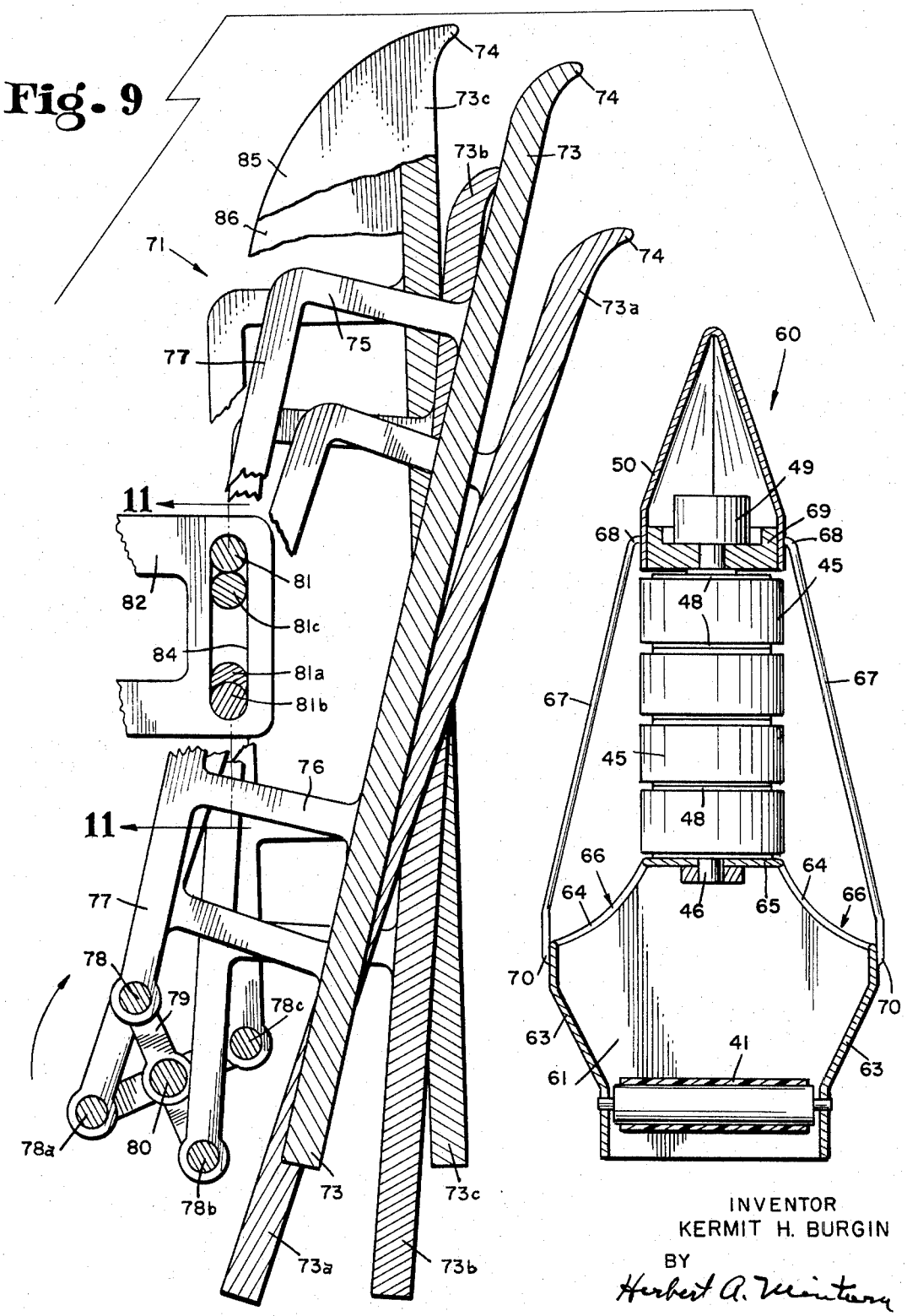

INVENTOR
KERMIT H. BURGIN
BY
ATTORNEY

United States Patent Office 3,387,443
Patented June 11, 1968

3,387,443
BRANCH SEPARATOR AND FRUIT PICKER
Kermit H. Burgin, R.R. 1, Whitestown,
Boone County, Ind. 46075
Filed Aug. 2, 1967, Ser. No. 657,834
10 Claims. (Cl. 56—328)

ABSTRACT OF THE DISCLOSURE

A combination of downwardly traveling members to divide tree branches and belts adjacent to and traveling laterally of the branch separating members for spinning fruit coming into contact therewith.

---

This invention relates to a fruit picker in general, and in the form herein shown, particularly to a citrus fruit picker. Reference is made to my two copending applications filed June 9, 1966, Ser. No. 556,317 and Apr. 10, 1967, Ser. No. 629,768, respectively.

Labor conditions have become such that the necessity for a mechanical picker has arisen. There are several problems to be solved in developing a successful picker. Orange trees have a maze of crossing branches and the foliage is dense. On one branch, there may be oranges ready for picking; small, undeveloped oranges; and blooms for future oranges. In picking the matured oranges, the remaining oranges in their various states must not be removed or damaged and neither should the foliage be stripped from the branches nor the branches themselves be broken. Moreover, an orange does not keep in transportation or for even a short time in storage, which orange has been pulled in straight line motion from its supporting twig or branch due to the fact that the stem is pulled loose to allow entrance into the orange of bacteria or the like setting up spoilage.

In hand picking, the orange is twisted or rotated on its stem and pulled thereaway. This action, practically simultaneous, leaves a "plug" in the orange sealing off entrance of the spoiling factors. Consequently, a successful mechanical picker must both twist and urge oranges downwardly when being picked. The invention herein set out is presented to accomplish successful picking.

In addition to accomplishing what it should, the structure embodying the invention is quite simple and may be employed in a desired number of consecutive units, side by side, carried by a tractor boom, to be swung upwardly through a tree. In its travel upwardly, it employs a mechanism which vibrates or swings laterally and rises vertically to push aside branches to cause the branches to feed between portions of orange separating means and slip out below. The separated oranges drop into a hopper onto a conveyor which carries the oranges to a discharge zone.

In describing the invention, reference is made to the accompanying more or less diagrammatic drawings in which FIG. 1 is a fragmentary top plan view of a single unit of a structure embodying the invention;

FIG. 3 is a longitudinal, vertical view in fragmentary section on the line 3—3 in FIG. 1 showing the branch separating mechanism of the unit;

FIG. 4 is a branch and orange contacting separator in vertical elevation;

FIG. 5 is a vertical section through the separator on the line 5—5 in FIG. 4;

FIG. 9 is a view in end elevation and partial section of a modified form of a picker;

Reference is made first to that form of invention as is illustrated in FIGS. 1-8.

Figure 7:
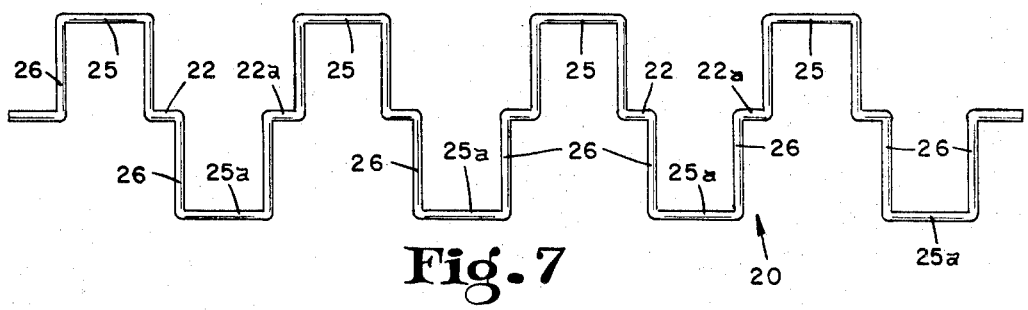
FIG. 7 is a view in side elevation of a separator operating crank.

A yoke base member 15 is formed to be engaged across its end 16 to a tractor boom (not shown). On one arm 17 of the base are fixed a plurality of pairs of upright posts 18 spaced laterally across the arm from a like member of posts 19. A crankshaft 20, FIG. 7, is journalled across like sides of upper portions of the posts 18, FIG. 3. A like crankshaft 20a is journalled across lower portions of the posts 18. Bearings 21 and 21a carried by the posts 18 carry the journals 22 and 22a of the crankshafts 20 and 20a, these two shafts being identical.

A separator 23 is rockably carried by the two crankshafts 20 and 20a by bearings 24, 24a fixed to the separator back in spaced relation equal to the spacing between the post bearings 21 and 21a, with journals 25 and 25a between crankshaft throws 26. Upon rotation simultaneously of the two crankshafts 20 and 20a, the separator journals 24 and 24a will describe circles as indicated by the dash lines 20' and 20'' and the separators 23 will travel up and down and laterally while at all times remaining in vertical positions.

The posts 19 carry in like manner two crankshafts 20 and 20a journalled thereto through bearings 24 and 24a, and, in turn the separator bearings 24 and 24a on additional separators 23, the bearings 24 and 24a being spaced apart the same distance as are the bearings 21 and 21a on the post 18. The four crankshafts are driven through a train 34 of gears from a common motor, such as a hydraulic motor 27. In this drive, the gearing is such that the rotation of the shafts will be sufficiently low in speed to have the shafts turn in the neighborhood of about sixty revolutions per minute.

The spacing of the row of posts 18 from the row of posts 19; the lengths of the crankshaft throws 26 and the positions of the throws of the shafts 20 on one row of posts 18 in angular relation to the throws of the shafts on the other row of posts 19 are disposed to bring the post rows as close together as possible without the separators of one row striking the separators of the other row. Note in FIG. 2 the difference in angular disposition of the two shafts. This disposition is readily had by merely shifting the intermeshing of the drive gears.

The separators have a concave face 29 with an overturned upper end 30. The facing is covered with a resilient material such as cellular rubber 31, and, from which, extend ribs 32 laterally across the face at verticals intervals therealong, FIG. 5.

A branch divider shield 35 is fixed to the front of the unit portion 28 to divide the tree branches as the picker is carried into the trees and to facilitate entrance of the branches in part to between the picker portions 28 and 36.

All of the foregoing description relates to that portion 28 which tends to bring branches relatively downwardly by the down travel of the separators in conjunction with the up travel of the portion 28.

The portion 36 is spaced from the portion 28 sufficiently to receive large oranges (such as three inches in diameter) along with the branches coming between these portions.

Figure 1:
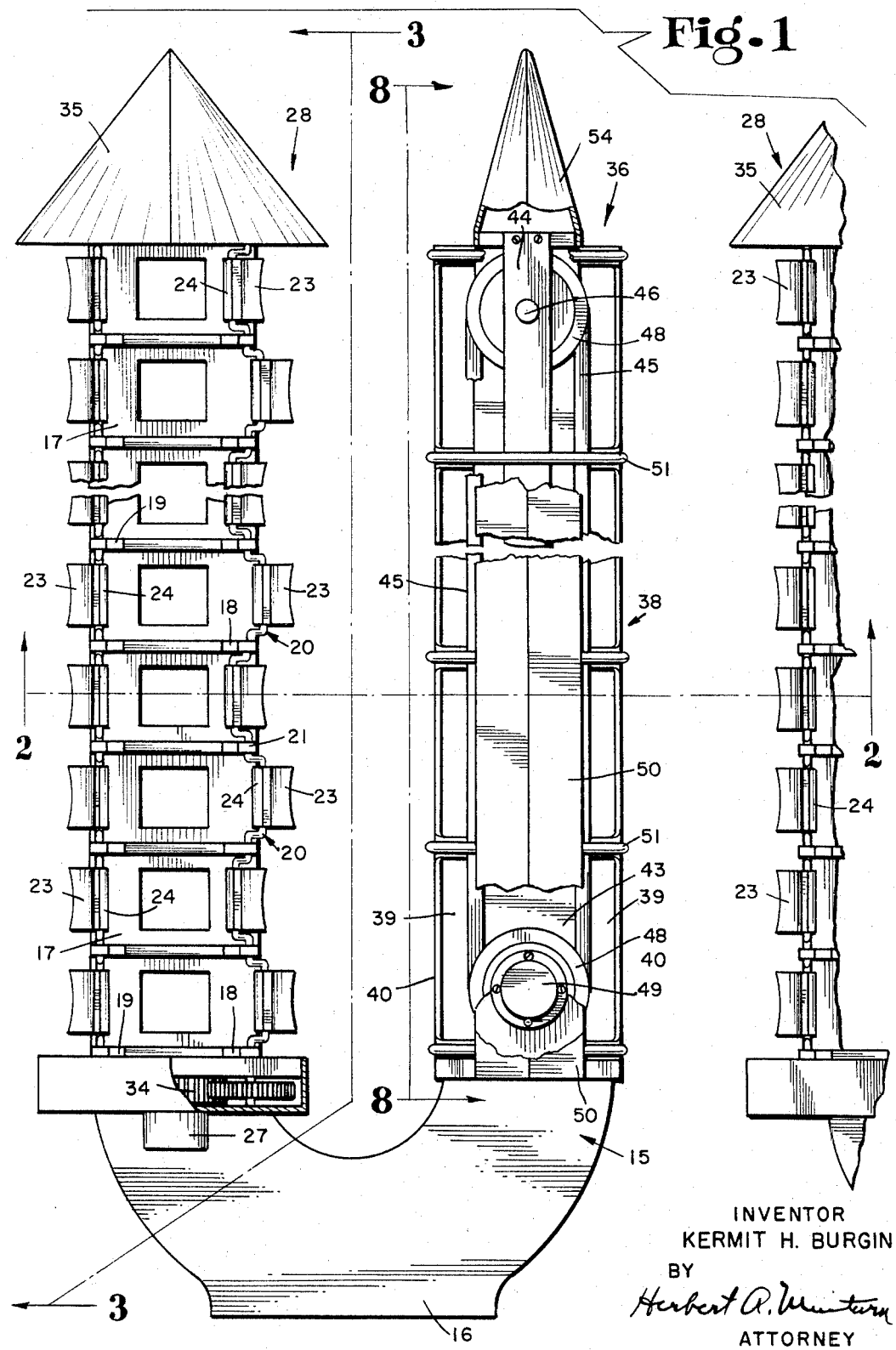
Figure 2:
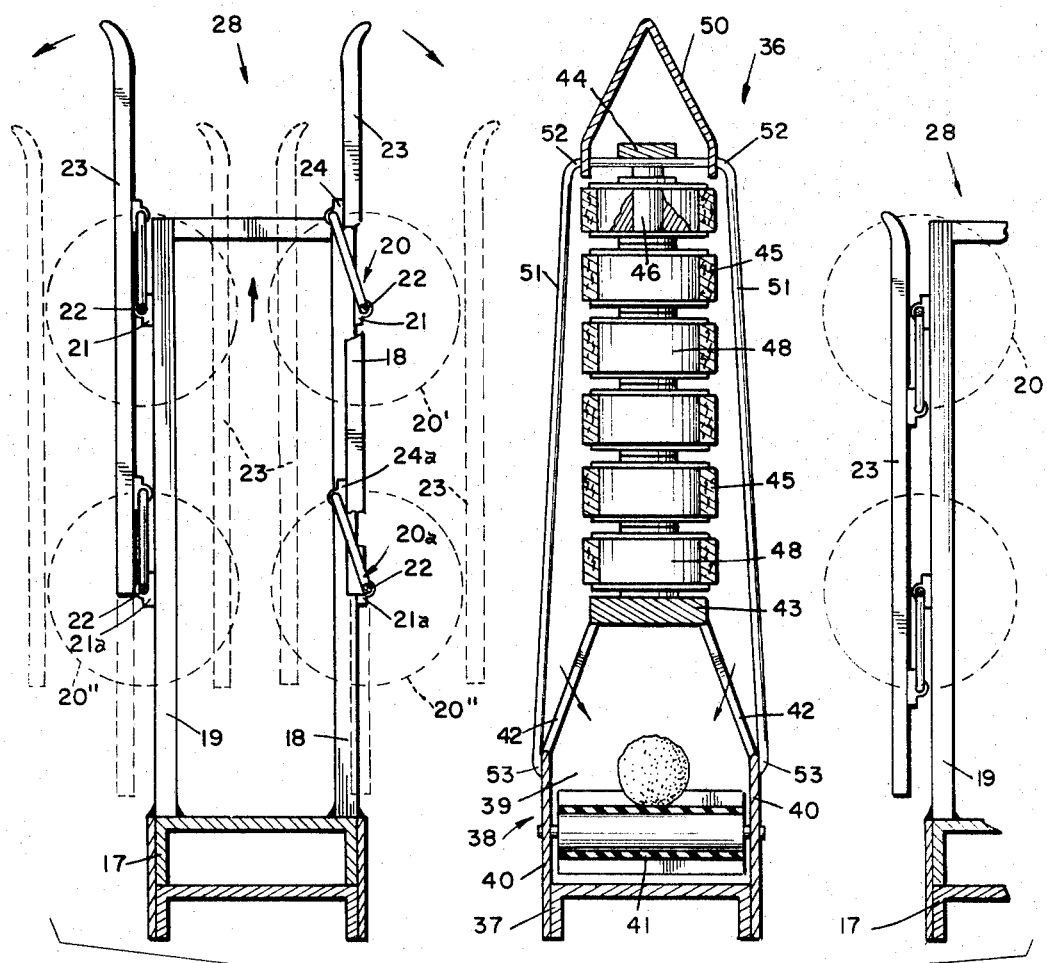
FIG. 2 is a vertical, transverse section on the line 2—2 in FIG. 1.
Figure 6:
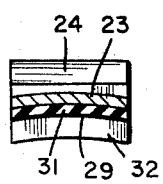
FIG. 6 is a transverse section through the separator on the line 6—6 in FIG. 4.

The base 15 has an extending arm 37 spaced laterally from the arm 17 and upon which arm 37 bears a superstructure, FIGS. 1 and 2, generally designated by the numeral 38. This structure 38 defines an elongated hopper 39 which is defined by sided walls 40 fixed to the arm 37 and extends upwardly to carry a belt conveyor 41 therebetween. The walls 40 slope inwardly and upwardly toward the others and are provided with openings 42 spaced therealong in the inclined parts. The walls 40 carry a platform 43 thereacross at their upper ends and a top cover 44 spaced vertically apart to receive therebetween a plurality of approximately horizontally running belts 45, herein shown as one example only, being six in number. These belts are entrained about pulleys 48 on horizontally spaced apart vertical shafts 46 and 47. In the present showing, the rear shaft 47 is power driven by a motor, preferably a hydraulic motor 49. The shafts 46 and 47 are carried and supported by the members 43 and 44.

A top shield 50 extends above and throughout the length of the cover 44, and is inverted V-shaped in cross section. The front end of the shield 50 terminates in a vertical shield 54, FIGS. 1 and 8, which is V-shaped in horizontal section.

A plurality of orange travel limiting rods 51 are provided to limit run away travel of the oranges horizontally when in contact with one or more of the belts 45. These rods 51 are fixed by their upper ends 52 to the cover 44 some on one edge and others on the other edge, FIG. 2. The lower ends 53 of the rods 51 are fixed to the respective walls 40. Preferably, a rod 51 is located between each of the adjacent openings 42.

The picker comprised of these two portions 28 and 36 may be widened from those portions by adding a portion 28, FIG. 1, to provide separators 23 on both sides of the belted portion 36, and further by using multiple sets (not shown) as may be desired. A metal plate shield (not shown) would cover the outermost exposed sides of the units 28 and 36 when those sides do not enter into the picking.

*Modified form*

Reference is made to FIGS. 9–13 wherein a modified form of picker construction is illustrated.

The portion with endless belts 60 corresponds to the portion 36 of the above described structure. In this portion 60, there is a hopper 61 which flares outwardly and upwardly by the side walls 63. A conveyor 41 is preferably carried between lower portions of the walls 63. These walls 63 have upper portions 64 sloping in a concave (from the outside) manner inwardly and upwardly to a hopper cover plate 65. Openings 66 through this concave wall extend are provided, as indicated in FIG. 9.

Figure 8:
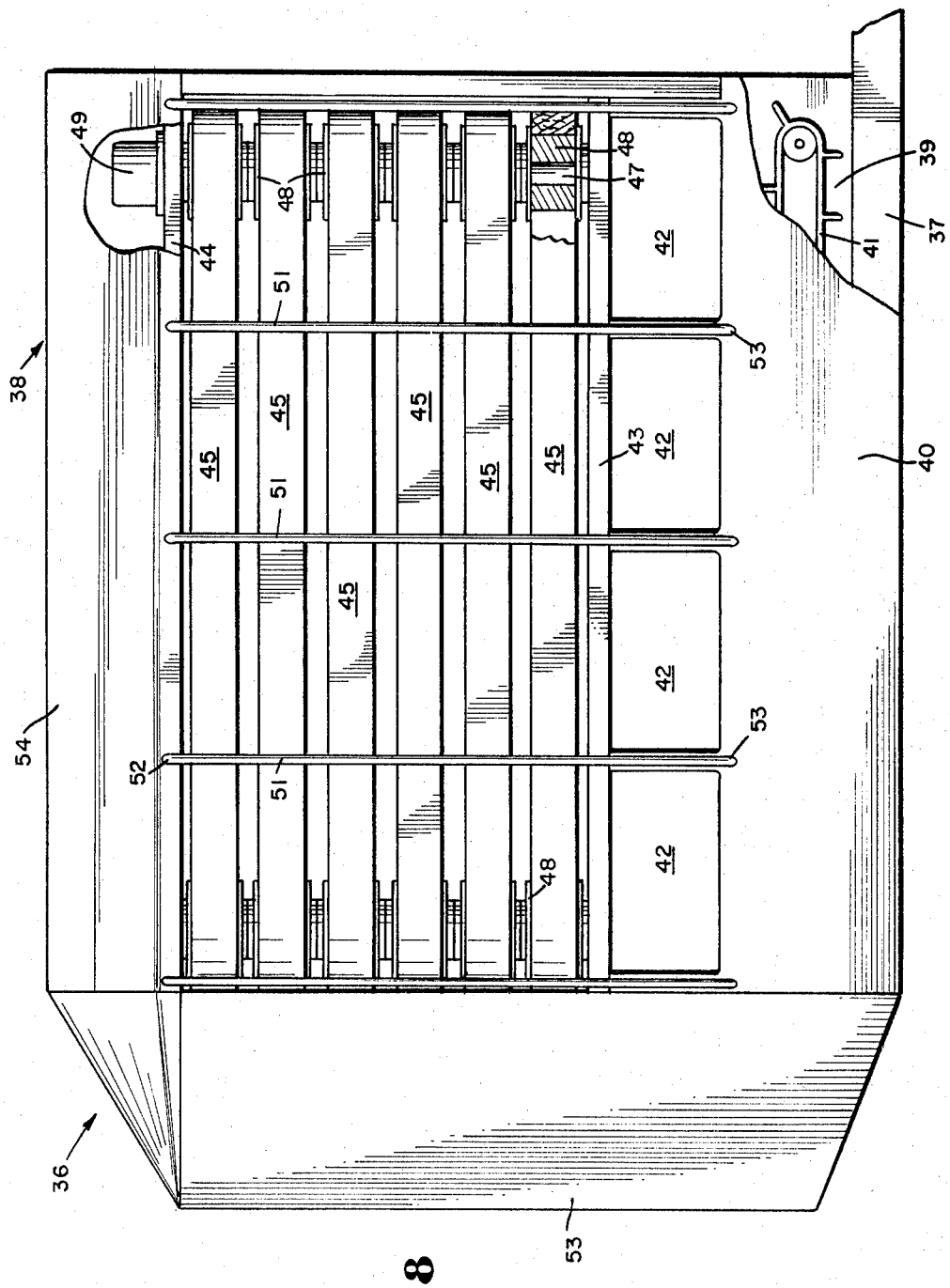
FIG. 8 is a view in section on the line 8—8 in FIG. 1 of the orange rotating and receiving portion of the single unit.
Figure 12:
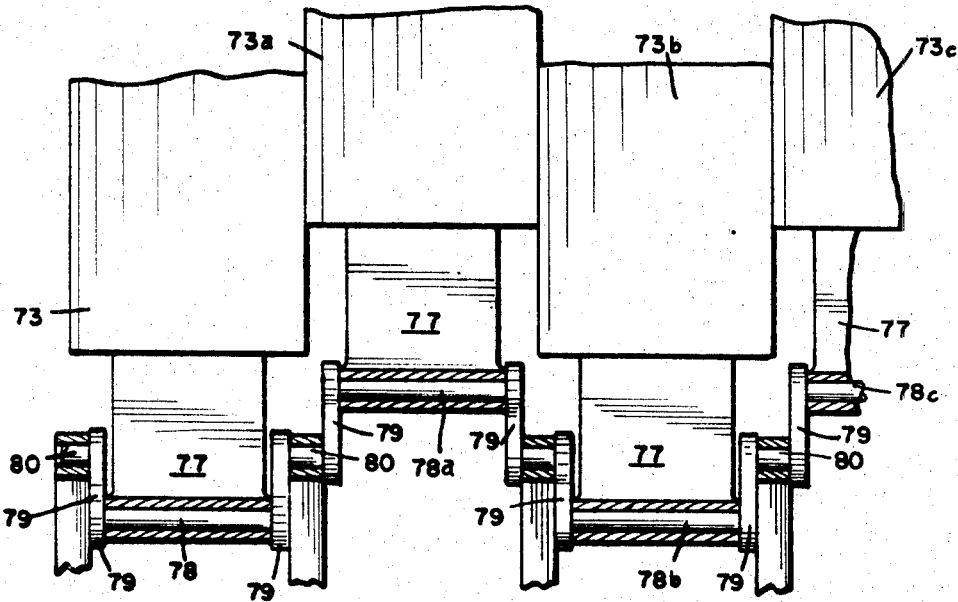
FIG. 12 is an elevation from the branch side of a fragmentary portion of a group of modified separators.
Figure 13:
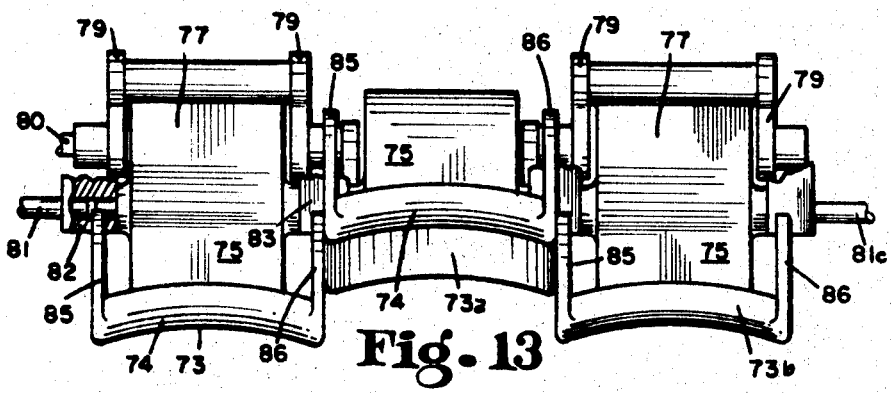
FIG. 13 is a top plan view of the group shown in FIG. 12.

Belts 45 are entrained about pulleys 48 carried on vertical shafts 46 and 47 as shown in FIGS. 2 and 8. A fewer number of belts 45 may be employed in this modified form. Spaced apart rods 67 are fixed on both sides of the belts 45, as indicated in FIG. 9. Each rod 67 has its upper end portion 68 fixed to a top member 69 which supports the upper ends of the shafts 46 and 47. The lower ends 70 are fixed to the side walls 63. The rods 67 are spaced one from the other on each side of the belts 45 distances to permit a limited horizontal travel only of the oranges when being rotated by the belts.

The branch divider and downward feeder is designated generally by the numeral 71.

A plurality of separators 73 all identical one with another may have working faces of the same characteristics as those of the separators 23 and hence are not shown in detail in that respect.

Each separator 73 has a main body, FIG. 9, wtih an overturned upper end 74. A pair of arms 75 and 76 are fixed to the back of the body at longitudinally spaced apart zones. The rear ends of these arms 75, 76 are fixed to a supporting post 77 which extends downwardly from the arm 75 to below the arm 76 where it is rockably carried on a crank pin 78 herein shown in one form as extending from a crank arm 79 fixed to a rotatable main shaft 80.

Figures 10, 11:
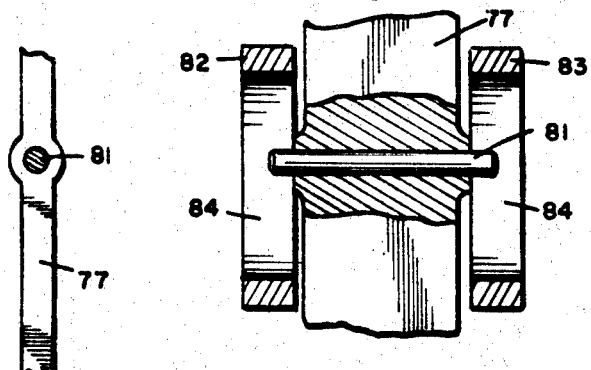
FIG. 10 is a detail in side elevation of a bearing portion of a separator bar as shown in FIG. 9.
FIG. 11 is a detail in section of a separator bearing and guide.

The post 77 carries a transversely extending pin 81 through a portion of its length intermediate the arms 75 and 76, FIG. 10. The post 77 extends upwardly from the crank pin 78 to pass between two rocking control, fixed positioned slides 82 and 83, FIG. 11. The pin 81 extends by end portions from each side of the post 77 to have those end portions extend with a sliding fit into a slot 84 in each of the slides 82 and 83. This slot 84 is approximately vertically disposed on a center line spaced to the side of the shaft 80 on which the separators 73 operate and exceed approximately one-half the throw of the pin 78. The vertical spacing of the slot 84 is that which will permit the full up and down travel of the pin 81 therein.

The location of the pin 81 along the post 73 will be a determinant of the degree of lateral travel of the post upper end as it is rocked by turning of the arm 79—the closer the pin 81 to the crank pin 78 the greater the rocking. The controlling factors of the degree of this separator rocking reside in the length of crank pin throw; the lateral location of the slot in reference to the crank pin throw; and the position of the post pin along the post.

As many separators 73 as may be needed for the desired length of the picker unit may be employed. But four separators 73 are shown by way of illustration. Additional separators 73a, 73b, and 73c are shown each respectively having a supporting post 77a, 77b, and 77c rockably carried by crank pins 78a, 78b, and 78c, and a rock and slide pin 81a, 81b, and 81c. In either form, the picker may have a length sufficient to reach into the tree foliage from thirty to forty inches.

This modified form of means for rocking the separators permits use of separators 73 which may rock one in reference to the other without twigs and leaves entering between adjacent separators 73. This is accomplished by rearwardly extending flanges 85 and 86, from opposite vertical separator edges, FIGS. 12 and 13. As the separators 73 rock, regardless of the difference in angular positions, the widths of the separators 73 are made to have the flanges 85 and 86 in each instance in sliding contact one with the other, the flanges 85 and 86 having a sufficient rearward extension in parallel planes so as to maintain that contact.

*Operation*

The base 15 is mounted on a tractor boom (not shown) to permit a wide range of travel vertically, horizontally and various orbital degrees therebetween. The base 15 is preferably carried under the lowermost tree branches which carry fruit. The separators are set into motion to achieve their extreme upper and lower positions, upper positions being indicated by solid line positions of the separators 23, FIG. 2, and by the position of separators 73c, 73a in the form in FIG. 9. Continued travel of the separaters in either form, together with a lifting of the base 15, carries the separator upper hooked ends 30 in a fixed sequence up between branches and then downwardly to hook over branches and separate and direct them into a group to pass relatively between the face sides of the separators and the belts 45. These branches are held in the main by the rods 51 or 67 from scraping across the belts.

During this relative branch travel, fruit on the branches is urged toward the belts to obtain a spinning thereof, stopped between adjacent rods and be urged downwardly by gravity and branch travel. The fruit, under this action, separates from the branches and drops between the rods through the openings 42 or 66 into the hopper 39 or 61 where fruit is conveyed to a discharge opening (not shown) for transfer to a transporting container (not shown). The branches come out from the picker between the arms 17 and 37.

After the base 15 has carried the picker to a height determined by the highest located fruit positions, the picker unit is withdrawn from within the foliage; moved around the tree and started upwardly again from the lowest fruit carrying branches. The release of the fruit from branches sets up a bending of the branches to whip upwardly, but since this tendency only occurs well down within the space between separators and belts, downcoming branches resist that shipping. Moreover, the lower ends of the separators come closer to the hopper than to the belts, again tending to reduce that tendency and block the possible return space and branch travel therethrough.

Therefore, it is to be seen that I have conceived a structure which is highly controllable and quite effective in picking fruit while at the same time avoiding gripping of branches, defoliaging, and bark-bruising, and while having described the structure in the two specific forms, I do not desire to be limited to those precise forms, since, after viewing those forms, it becomes obvious to make structural changes without departing from the spirit of the invention, and within limitations which may be imposed by the following claims.

I claim:
1. A citrus fruit picker comprising
    a base;
        tree branch separating means having up and down and laterally travelling separators carried by said base; and
    belt means disposed opposite said separators and spinning fruit coming into contact therewith.
2. The structure of claim 1, in which there is
    means inducing and directing the travelling of said separators toward and away from said belt means.
3. The structure of claim 1, in which
    said belt means is spaced from said separators and includes belts travelling at approximately right angles to the travel of said separators.
4. The structure of claim 3, in which there is
    a hopper below said belts with openings through which the fruit may pass; and
    stop members across the belts limiting travel of the fruit therealong, said members being spaced from the belts toward said separators limiting contact of tree branches with the belts.
5. The structure of claim 1, in which
    said separating means comprises a crankshaft to which said separators are rockably attached to set up said travelling; and
    said separators in said travelling advancing upwardly, downwardly and laterally toward said belt means and thereaway to return to upper positions for subsequent down travel.
6. The structure of claim 5 including
    a second crankshaft spaced from the first crankshaft, and to which said separators are also rockably attached; and
    said separators in said travelling remaining in parallel relation one with the other.
7. The structure of claim 5, wherein
    said separators define a varying width spacing from said belt means, through which spacing said tree branches travel to be released below the separators and belt means.
8. The structure of claim 5 wherein there is
    a stationary separator guide having an up and down slot; and
    a guide pin carried by each separator and entering said slot;
    said guide pin providing an up and down travelling axis of rocking of the separator.
9. The structure of claim 1, in which
    said separators each have a resilient face, across which extend ribs; and said face opposes said belts.
10. The structure of claim 7, in which
    said belt means comprises belts entrained about pulleys spaced apart to permit yielding pushing of one or more belts by fruit to increase said spacing in fruit-to-belt pressing zones.

References Cited

UNITED STATES PATENTS

| | | | |
|---|---|---|---|
| 2,968,141 | 1/1961 | McGough | 56—332 |
| 3,143,844 | 8/1964 | Polk | 56—328 |
| 3,161,007 | 12/1964 | Bergquist | 56—332 |
| 3,197,952 | 8/1965 | Lasswell | 56—328 |

RUSSELL S. KINSEY, *Primary Examiner.*